(12) United States Patent
Seccombe, Jr. et al.

(10) Patent No.: US 7,196,297 B2
(45) Date of Patent: Mar. 27, 2007

(54) PROCESS AND SYSTEM FOR THERMALLY UNIFORM MATERIALS PROCESSING

(75) Inventors: Donald A. Seccombe, Jr., Gloucester, MA (US); Gary Orbeck, Windham, NH (US)

(73) Assignee: BTU International, Inc., N. Billerica, MA (US)

( * ) Notice: Subject to any disclaimer, the term of this patent is extended or adjusted under 35 U.S.C. 154(b) by 0 days.

(21) Appl. No.: 10/775,542

(22) Filed: Feb. 10, 2004

(65) Prior Publication Data

US 2004/0173608 A1  Sep. 9, 2004

Related U.S. Application Data

(60) Provisional application No. 60/446,179, filed on Feb. 10, 2003.

(51) Int. Cl.
*H05B 6/68* (2006.01)
*H05B 6/78* (2006.01)
*F27B 3/22* (2006.01)

(52) U.S. Cl. .................. 219/681; 219/685; 219/702; 219/757; 219/762; 419/52; 419/53; 432/176; 432/199

(58) Field of Classification Search ........ 219/678–686, 219/702, 710, 756–757, 761, 762; 432/176, 432/199; 419/52–55
See application file for complete search history.

(56) References Cited

U.S. PATENT DOCUMENTS

| | | | |
|---|---|---|---|
| 5,321,222 A | 6/1994 | Bible et al. ................ 219/745 |
| 5,521,360 A | 5/1996 | Johnson et al. ............. 219/709 |
| 5,660,543 A * | 8/1997 | Marks et al. ................ 432/152 |
| 5,795,146 A | 8/1998 | Orbeck ........................ 432/176 |
| 5,911,941 A * | 6/1999 | Rokhvarger et al. ........ 264/432 |
| 5,954,986 A * | 9/1999 | Tsukamoto et al. ......... 219/754 |
| 5,961,871 A | 10/1999 | Bible et al. ................. 219/709 |
| 6,344,634 B2 * | 2/2002 | Brennan ..................... 219/681 |
| 6,512,216 B2 * | 1/2003 | Gedevanishvili et al. ... 219/759 |
| 2003/0071037 A1 * | 4/2003 | Sato et al. .................. 219/731 |

FOREIGN PATENT DOCUMENTS

GB  2 262 333  * 6/1993  ................ 219/678

* cited by examiner

*Primary Examiner*—Philip H. Leung
(74) *Attorney, Agent, or Firm*—Weingarten, Schurgin, Gagnebin & Lebovici LLP

(57) ABSTRACT

The present invention provides a system and method for binder removal and sintering of materials such as ceramic materials and products, LTCC intervals, solid oxide fuel cells and powder metals. A combination of microwave and convection/radiation heating is employed for binder removal and sintering. Preferably, the microwave heating is accomplished using a variable or multi-frequency microwave source. A gas atmosphere is provided in the furnace chamber by one or more eductors which produces a high volume gas circulation in the furnace chamber to achieve a highly uniform gas environment and temperature. The process in accordance with the invention controls the heating cycle, the heat sources and thermal profile depending upon the composition of the particular material being processed. The thermal processing can be accomplished in a batch furnace in which a product is loaded for processing and unloaded after processing. The invention can also be practiced in a continuous process wherein the product is conveyed between furnace sections or chambers of a furnace.

40 Claims, 4 Drawing Sheets

PROCESS AND SYSTEM FOR THERMALLY UNIFORM MATERIALS PROCESSING

CROSS REFERENCE TO RELATED APPLICATIONS

This application claims the priority of provisional patent application No. 60/446,179, filed Feb. 10, 2003 and incorporates the same by reference.

STATEMENT REGARDING FEDERALLY SPONSORED RESEARCH OR DEVELOPMENT

N/A

BACKGROUND OF THE INVENTION

In the processing of materials such as ceramics, thermal uniformity is often required to achieve uniform heating of the product and to minimize opportunities for distortion, bending or cracking of the product by reason of uneven heating. The uniformity of heating and the control thereof is particularly critical in the processing of ceramic materials, such as low temperature cofired ceramics and ceramic membranes, powder metals and solid oxide fuel cells. Such materials are formed of a ceramic or metal powder retained in a binder material. The binder material is removed during initial stages of a thermal process cycle and after binder removal, the ceramic or metal powder is sintered to provide a monolithic sintered mass. Efficient removal of the binder prior to sintering is essential to achieve high quality sintering of the final product.

BRIEF SUMMARY OF THE INVENTION

In brief, the present invention provides a system and method for thermal processing of materials and more particular for binder removal and sintering of materials such as LTCC and other ceramic materials and products. The invention is also useful for thermal processing of other products and materials such as solid oxide fuel cells and powder metals. A combination of microwave and convection/radiation heating is employed for binder removal and sintering. Preferably, the microwave heating is accomplished using a variable or multi-frequency microwave source. A gas atmosphere is provided in the furnace chamber by one or more eductors which produces high volume gas circulation in the furnace chamber to achieve a highly uniform gas environment and temperature. The one or more eductors can also be employed for forced convection cooling of the product. The process in accordance with the invention controls the heating cycle, the heat sources and thermal profile depending upon the composition of the particular material being processed.

The thermal processing can be accomplished in a batch furnace in which a product is loaded for processing and unloaded after processing. Typically, for production operation a quantity of individual products is loaded into the furnace on a product holding assembly. The invention can also be practiced in a continuous process wherein a product is conveyed between furnace sections or chambers of a furnace to accomplish binder removal and sintering or other process cycle.

According to one aspect of the invention, the binder material is analyzed, such as by TGA analysis, to determine the constituents or species present in the binder material. The power and/or frequency of the microwave power source and the power level of the convection/radiation heat source are adjusted in accordance with the composition of the binder material to efficiently volatilize or burn-off the binder constituents. The heat sources are adjusted for the steps of a production operation based upon the test data obtained during test runs on the particular material to be processed. The microwave source and the convection/radiation source may be controllable in a closed loop manner based upon data sensed from analysis of the binder composition during a processing cycle.

BRIEF DESCRIPTION OF THE SEVERAL VIEWS OF THE DRAWINGS

The invention will be more fully described in the following detailed description taken in conjunction with the drawings in which.

DETAILED DESCRIPTION OF THE INVENTION

Figure 1:
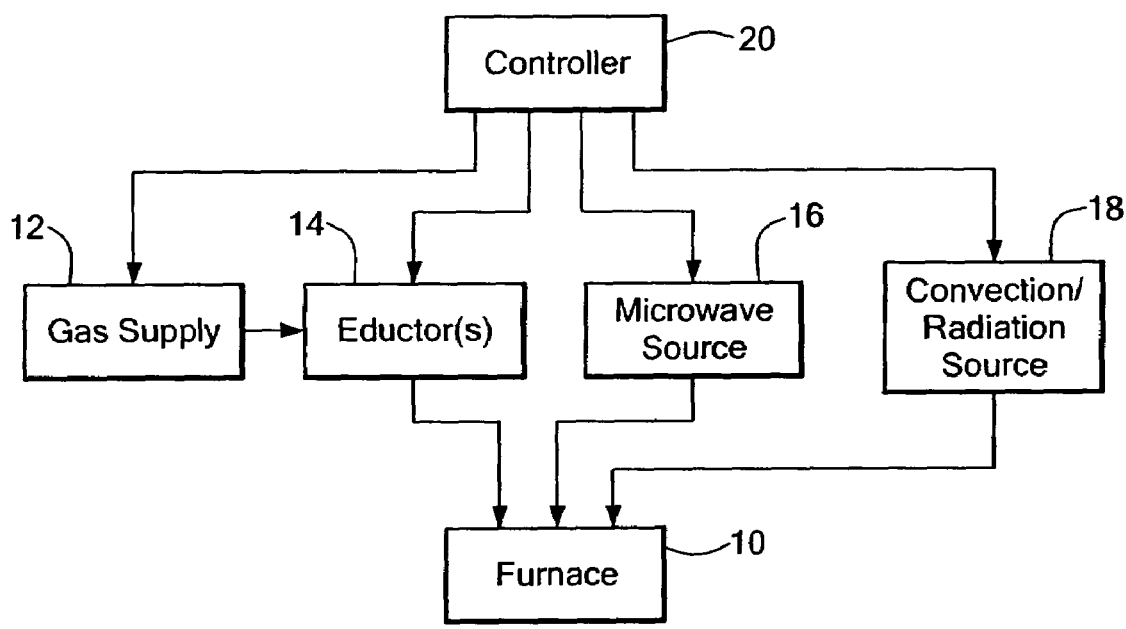
FIG. 1 is a block diagram of a furnace system in accordance with the invention.

Referring to FIG. 1 there is shown in diagrammatic form a furnace 10 constructed to hold a quantity of materials or products to be thermally processed, and associated therewith a gas supply 12, one or more eductors 14, a microwave source 16 and a convection/radiation heating source 18. A controller 20 governs the gas source, the eductors and the heating sources and is typically a microcontroller or computer. The gas source 12 provides an atmosphere for the furnace chamber suitable for processing of the particular materials. The atmosphere is typically air or nitrogen or a combination thereof for processing LTCC and other ceramic products and fuel cells. The atmosphere is typically a combination of hydrogen and nitrogen for processing powder metals. For some purposes, the atmosphere may be water vapor with or without other gas. The one or more eductors introduce the gas into the furnace chamber and provide uniformity of the furnace atmosphere and temperature by producing high volume, high efficiency convection flow which is desirable to achieve intended temperature uniformity and uniform distribution of the gas atmosphere across the materials being processed. The one or more eductors can also provide forced convection cooling of the product. The flow direction of the gas atmosphere can be alternated between forward and reverse directions using a programmed timing cycle in order to increase process precision. Flow control is under the guidance of controller 20.

Two different types of heating sources are employed, one being the microwave source 16, which preferably is a variable or multi-frequency microwave source, and the other being the convection/radiation heating source 18. The heating sources are controlled by controller 20 during the heating cycle to provide an intended thermal profile and to provide uniform volumetric heating of the materials throughout the heating cycle. The heating sources are controlled during the process cycle in accordance with the particular material being processed including the composition of the binder material and composition of the powder material being sintered or otherwise processed. The microwave heating source and the convection/radiation heating source may both be operative during an entire heating cycle, with the magnitudes of respective heating sources being adjusted in accordance with an intended thermal profile. Alternatively, one or the other of the heating sources may be on during a portion or portions of a heating cycle and off during another portion or portions of a heating cycle, depending upon an intended thermal profile and the material being processed.

The control of the heat sources is based upon several parameters, including the mass or thickness of the product to be processed. The power level, frequency, waveform and mode of the microwave source can be adjusted to provide efficient heating of the product. The power level of the convection/radiation source can also be adjusted to provide the intended heating. Some or all of the parameters may be controllable to provide a particular thermal profile for the particular size and composition of the product or material being processed.

The microwave source 16 is preferably a variable frequency or multi-frequency microwave source such as shown in U.S. Pat. Nos. 5,321,222, 5,521,360 and 5,961,871, the disclosures of which are incorporated herein by reference. The frequency and power level of the microwave source is adjusted to provide efficient coupling of microwave energy to the material being processed. The microwave frequency can be modulated or swept across a frequency band of interest or the microwave energy can be provided at two or more frequencies to provide an intended microwave spectrum.

The convection/radiation heating source 18 can be of any convenient form to provide heating of the gas atmosphere within the furnace chamber and suitable for the maximum operating temperature of the furnace for the particular materials being processed. As an example, nickel-chromium electrical heaters can be used for a maximum temperature up to about 1000° C. Molybdenum ribbon heaters can be employed for a maximum temperature up to about 1250° C. Molybdenum-silicate or silicon-carbide heaters can be employed up to a temperature of about 1600° C. For lower temperatures, heating can alternatively be provided by heated gas emitted from an aperture plate above and/or below the product.

The one or more eductors 14 are preferably as shown in U.S. Pat. No. 5,795,146 which is assigned to the assignee of the present invention and the disclosure of which is incorporated herein by reference. An eductor is a device that produces a high volume flow of a mixture of a gas entrained in an injected high pressure gas. The eductors provide high volume flow necessary for improved temperature uniformity and control and can provide a thermal uniformity of plus or minus 5° C. during the process cycle. In one embodiment, the furnace 10 is a batch furnace shown in cross-section section in FIG. 2, for containing a quantity of materials to be processed. The furnace comprises a housing 30 enclosing insulative material 32 which surrounds a furnace chamber 24. A furnace hearth 36 supports an assembly 38 which holds a quantity of materials to be processed. The hearth is mounted on a moveable assembly 40 which can be moved upward into the furnace chamber and lowered downward to a position in which the hearth and the product contained thereon is outside of the furnace chamber for loading and unloading of the materials. An elevator mechanism (not shown) is employed to move the hearth between upper and lower positions. The elevator mechanism may include on or more lead screws or other mechanisms known in the art. A plurality of electrically energized radiant heaters 42 are disposed in the furnace chamber along the two sides thereof, each heater being suspended from an opening in an upper wall of the furnace. Each heater has electrical terminals 44 above the upper wall of the furnace chamber, these terminals being connectable to an electrical power source (not shown) for energizing the heaters. A microwave input port 46 is provided in the furnace chamber and is coupled to a microwave source to introduce microwave energy into the chamber for heating of the product.

Figure 2:
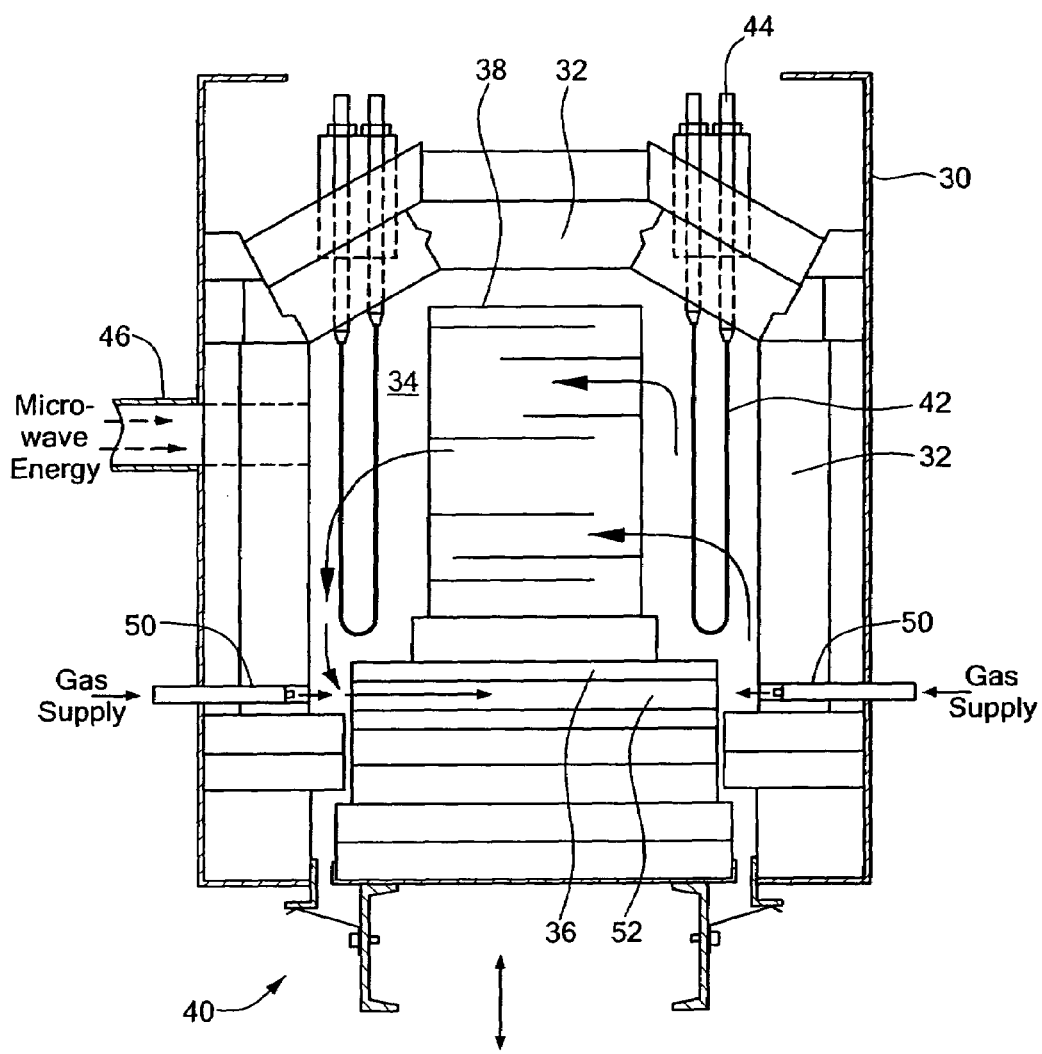
FIG. 2 is a sectional elevation view of a batch furnace in accordance with the invention.
Figure 3:
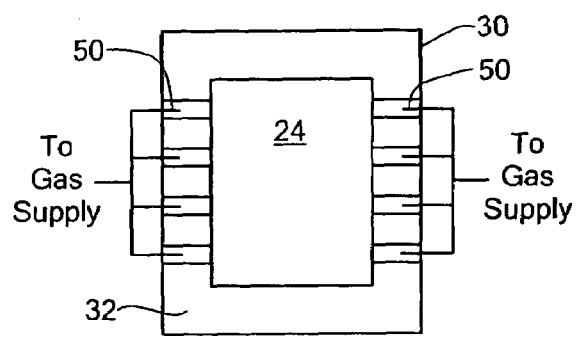
FIG. 3 is a diagrammatic top view of the furnace of FIG. 2 showing the array of eductors.

One or more eductors 50 are disposed on each side of the furnace. Typically, a plurality of eductors are disposed along each side of the furnace. Each eductor on one side is generally in line with the eductor on the opposite side. An opening 52 is provided through the hearth 36 in alignment with the eductors to provide a circulation path through the hearth from one side of the furnace chamber to the other side of the chamber. The arrows shown in FIG. 2 illustrate a typical flow path of recirculating gas during furnace operation. An array of four eductors 50 is shown in FIG. 3 on each side of the furnace chamber which is shown in a diagrammatic top view. The eductors are supplied with gas from a gas source, such as supply 12 shown in FIG. 1.

In an alternative implementation, one or more eductors may be disposed through the roof of the furnace, or roof mounted eductors can be provided in combination with wall mounted eductors depending upon the particular furnace configuration and intended circulation flow to be achieved. For some purposes a single eductor can provide the intended circulation and uniform atmosphere.

Figure 4:
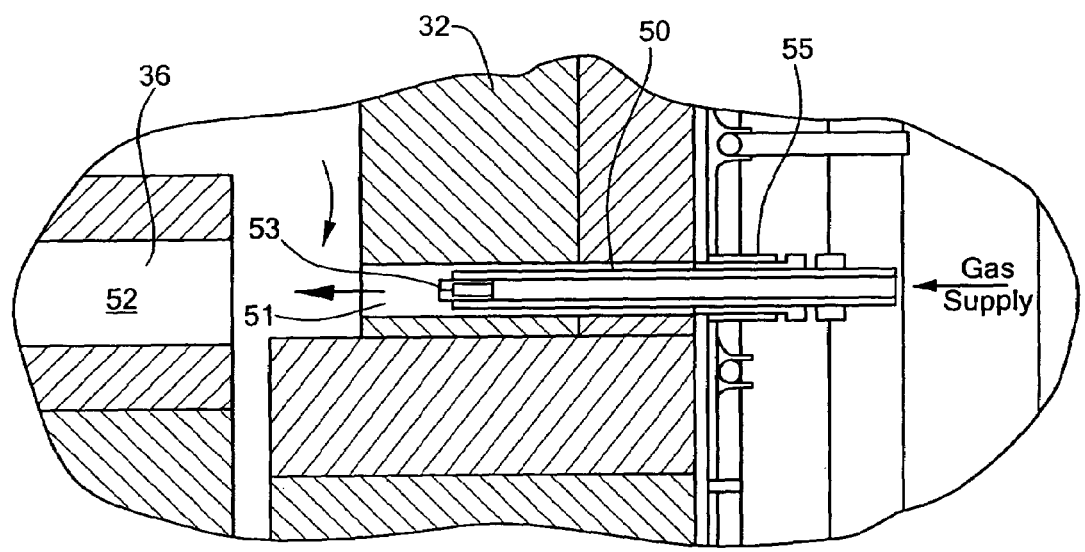
FIG. 4 is a sectional elevation view of an eductor as used in the embodiment of FIG. 2.

The eductor is shown in greater detail in FIG. 4 which depicts the eductor 50 installed in the wall of the furnace embodiment of FIG. 2. The eductor is disposed through an opening 51 in the wall of insulation 32. The eductor is retained in position by a fitting 55 and is coupled to the gas supply. The inner end of the eductor terminates in a nozzle 53 which ejects a high velocity stream of gas into the furnace chamber. As noted above, an opening 52 is provided through the hearth 36 and which confronts the eductor nozzle to provide a path through the hearth for flow of gas to the opposite side of the furnace chamber. The high velocity gas flow from the eductor causes entrainment of gas in the furnace chamber into the gas stream. Ratios of the volume of entrained gas with respect to the volume of injected gas of up to 50:1 can be achieved. In the illustrated embodiment, gas amplification of 20–30 times the injected volume is provided. The eductors are of relatively simple construction and provide high gas circulation at a relatively low cost.

The eductors are operated in complementary manner such for that one time interval the eductors on one side of the furnace are on, while the eductors on the opposite side of the furnace are off. For the next time interval, the operation of the eductors is reversed such that the formerly off eductors are on, while the formerly on eductors are off. The alternating operation of the eductors provides further uniformity of gas atmosphere within the chamber by reason of the alternating circulatary flow paths. In the off mode, the eductors are not completely shut off, but provide a small amount of gas flow, typically about 5% of full flow, in order to avoid damage to the eductor nozzles at the high operating temperatures of the furnace and to avoid air or other contaminants entering the furnace chamber through the eductor assembly.

As noted above, the eductors can also be employed to provide forced convection cooling of the product such as during the cool-down portion of a thermal cycle. The gas flow from the eductors is controlled in conjunction with control of the heat sources to achieve an intended rate of cooling of the product.

The materials or products to be processed are retained in a suitable support assembly. One typical form of support is a tray having multiple compartments for respective items to be processed, the trays being stackable one on top of the other such that a relatively large quantity of items can be processed at a single time within the furnace chamber. The support assembly can be of other types such as a suitably configured rack for holding particular products to be processed. For some purposes it is useful to sandwich the product between upper and lower plates or other supports to prevent distortion of the product during the heating cycle. The product holders are made of a refractory material capable of withstanding the operating temperatures of the furnace.

Figure 5:
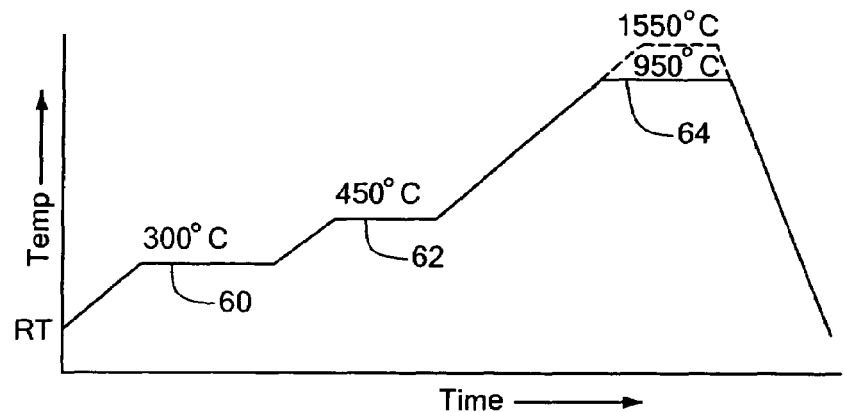
FIG. 5 is a typical thermal profile for the batch furnace of the invention.

A typical temperature profile provided during a heating cycle is shown in FIG. 5. The furnace chamber is initially heated from room temperature (RT) to a first level 60 which in the illustrated profile is 300° C. After a defined period of time at this temperature, the furnace temperature is raised to a level 62 which in the illustrated profile is 450° C. After a defined period at the 450° C. temperature, the furnace temperature is ramped up to the maximum temperature level 64 of 950° C. The temperature remains at this 950° C. level for a predetermined period of time and thereafter the temperature is lowered back to room temperature. It will be appreciated that the particular temperature levels and the number of such levels will be determined to suit the particular materials being processed, thus, the illustrated temperatures and levels are for exemplary purposes only. It will also be appreciated that the time at which each temperature level is maintained will vary to suit the particular materials and process requirements. The overall process time may vary from several hours to one or two weeks or more.

During the initial portion of the heating cycle, moisture is driven from the materials being processed. As an example, such moisture release usually occurs in a temperature range of about 125–1500° C. As the temperature continues to rise, binder removal occurs during which solvents, plasticizers and other constituents of the binder material are volatilized. A typical range for such binder removal is about 275–375° C. The removal of binder material usually leaves a carbon residue which is volatilized at temperatures of about 500–600° C. Sintering of the material occurs at the highest temperature level of the process cycle. In the illustrated embodiment, a temperature of about 950° is shown which is a typical temperature for processing LTCC materials. For processing solid oxide fuel cells, a sintering temperature is about 1550° C. as shown in dotted outline in FIG. 3.

Figure 6:
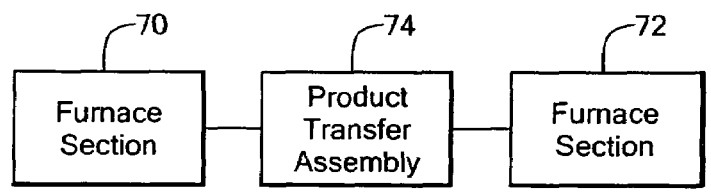
FIG. 6 is a block diagram of a continuous furnace system in accordance with the invention.

In another aspect of the invention, a continuous thermal process and system are provided for processing ceramics, powder metal and other materials and products. The continuous system is illustrated in FIG. 6 and includes a first furnace section 70, a second furnace section 72 and an interconnecting product transfer assembly 74 for moving the product from the furnace section 70 to furnace section 72. Each of the furnace sections 70 and 72 include a microwave heating source and a convection/radiation heating source, as in the embodiments described above. In one version of the continuous system, the furnace sections 70 and 72 are separate furnaces. Alternatively, the furnace sections 70 and 72 can be zones of a unitary furnace structure with the transfer assembly 74 provided within the structure. After materials processing in furnace section 70, the temperature of section 70 must be lowered to a temperature sufficient to permit handling of the materials by the transfer assembly and movement of the materials to the section 72. Each of the sections 70 and 72 employs a door which can be opened for product loading and unloading and closed during heating operation. Each furnace section may also contain a microwave choke assembly to prevent leakage of microwave energy from the furnace.

The furnace section 70 is employed for binder removal, and the furnace section 72 is employed for sintering of the materials. As described above, the heating sources can be employed individually or in combination for binder removal and/or for sintering. The furnace section 70 preferably includes a multi-frequency microwave source and a forced convection/radiation source using one or more eductors as described above to provide uniform volumetric heating of the materials being processed for binder removal. The furnace section 72 employed for sintering of the materials can also include the combined microwave and convection radiation sources as with furnace section 70, but alternatively can be a conventional fast fire sintering furnace using only convection and/or radiation heating.

Figure 7:
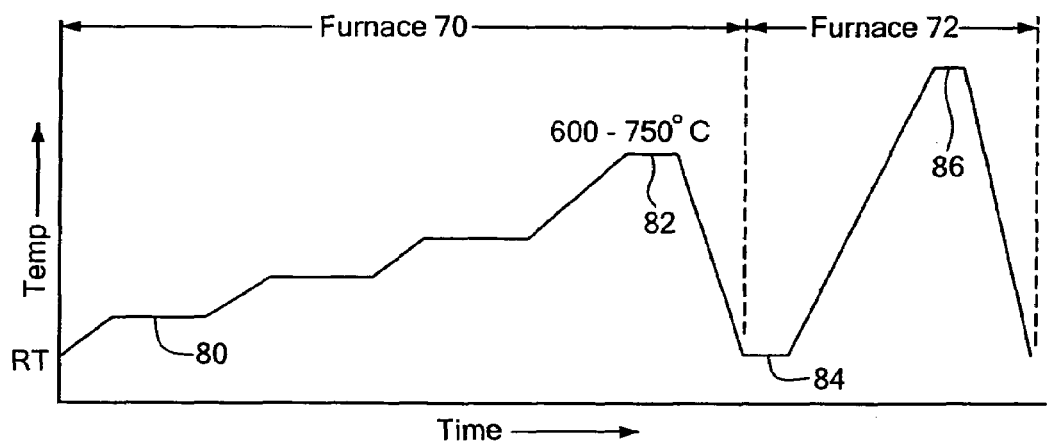
FIG. 7 is a typical thermal profile for the continuous furnace of the invention.

A typical thermal profile for continuous processing of materials is shown in FIG. 7. The temperature of furnace section 70 is raised from room temperature through successive levels 80 to a maximum level 82 which is illustrated to be in the range of about 600°–750° C. After an intended period of time at the maximum temperature, the furnace is cooled down to a lower level 84 which is sufficiently cool to open the furnace and remove the materials for conveyance into furnace section 72. After loading of the materials into furnace 72, the temperature of furnace 72 is raised to a desired maximum temperature level 86 for a time sufficient for sintering of the particular materials, and after such time the temperature is lowered to room temperature for removal of the sintered materials from the furnace 72. The particular temperature levels and the number of temperature steps and the duration of time at which each temperature level is maintained is determined to suit the particular materials or type of items being processed.

The invention is not to be limited by what has been particularly shown and described. The invention can be embodied in single and multi-zone furnaces and in batch or continuous type furnaces of various constructions. The invention can also be utilized with a variety of conveyer mechanisms to move products into and out of a furnace or to convey products between furnace sections or zones. It is intended that the invention should comprehend the full spirit and scope of the appended claims.

What is claimed is:

1. A system for thermally processing materials comprising:
   a furnace housing having a furnace chamber;
   a support assembly disposable in the furnace chamber for supporting the materials to be thermally processed;
   a microwave heating source operative to heat materials in the furnace chamber;
   a convection/radiation heating source operative to heat the materials in the furnace chamber; and
   a plurality of eductors each having an outlet located in the furnace chamber to provide circulation of gas within the furnace chamber, the eductors each comprising a device producing a high volume flow of a mixture of a gas entrained in an injected high pressure gas, one or more openings extending through the support assembly from one side of the furnace chamber to the other side, each eductor aligned with a respective opening through the support assembly to provide a circulation path from one side of the furnace chamber to the other side.

2. The system of claim 1 including a plurality of eductors on first and second sides of the furnace chamber for providing a uniform gas atmosphere in the furnace chamber.

3. The system of claim 1 wherein the microwave heating source comprises a variable frequency microwave heating source.

4. The system of claim 1 wherein the microwave heating source comprises a multi-frequency microwave heating source.

5. The system of claim 1 wherein the support assembly includes an elevator hearth moveable between a lower position for loading and unloading of materials to be thermally processed, and an upper position for disposing the materials in the furnace chamber.

6. The system of claim 1 wherein the eductor includes a tubular body having a nozzle in communication with a gas supply and providing high velocity gas into the furnace chamber and disposed to entrain gas in the furnace chamber to provide high volume circulation of gas within the furnace chamber.

7. The system of claim 1 wherein the microwave heating source is operative during a portion of the heating cycle.

8. The system of claim 1 wherein the microwave heating source is operative for a period of time during a heating cycle when the materials being processed are at a temperature to be microwave receptive.

9. The system of claim 1 including a controller for controlling the microwave heating source and the convection/radiation heating source to provide an intended thermal profile during a heating cycle.

10. The system of claim 9 wherein the controller controls the gas flow of the one or more eductors.

11. The system of claim 1 wherein the one or more eductors are operative to provide forced convection cooling of the materials during a portion of a thermal cycle.

12. The system of claim 1 including a plurality of eductors.

13. The system of claim 1 including at least one eductor on each side of the furnace chamber and operative in alternating manner to provide uniform circulation of gas in the chamber and uniform heating of the materials.

14. The system of claim 1 wherein the support assembly in the furnace chamber further comprises a hearth, the one or more openings extending through the hearth from one side of the furnace chamber to the other side of the furnace chamber;

and wherein the one or more eductors includes a plurality of eductors on first and second sides of the furnace chamber, each pair of eductors on respective sides of the furnace chamber being in line with a respective opening through the hearth.

15. The system of claim 14 wherein each of the eductors is disposed in a sidewall opening of the furnace housing.

16. The system of claim 1 wherein the convection/radiation heating source includes one or more electrically energized heaters disposed in the furnace chamber.

17. The system of claim 1 wherein the furnace chamber is in a batch furnace operative to have materials loaded therein for processing and unloaded after processing.

18. The system of claim 1 wherein the furnace chamber is in a continuous furnace operative to have materials conveyed therethrough during a processing cycle.

19. The system of claim 1, wherein the microwave heating source has an adjustable power level.

20. A system for thermally processing materials containing ceramic or metal powder retained in a binder comprising:
a furnace having a furnace chamber;
a support assembly disposable in the furnace chamber for supporting the materials to be thermally processed;
a microwave heating, source operative to introduce microwave energy into the furnace chamber to heat the materials disposed therein;
a convection/radiation heating source in the furnace chamber and operative to heat the materials disposed therein;
one or more eductors on each side of the furnace chamber, operation of the one or more eductors on one side alternating with operation of the one or more eductors on the other side according to a tinting cycle to provide forward and reverse flow directions in the chamber, to achieve a uniform and high volume circulation of gas within the furnace chamber, the eductors each comprising a device producing a high volume flow of a mixture of a gas entrained in an injected high pressure gas; and
the microwave heating source and the convection/radiation source being controlled during a first portion of a heating cycle to remove the binder from the materials being processed, and being controlled during a second portion of a heating cycle to sinter the powder into a monolithic mass.

21. The system of claim 20 wherein the convection/radiation heating source includes one or more electrically energized heaters disposed in the furnace chamber.

22. The system of claim 20 wherein the microwave heating source comprises a variable frequency microwave heating source.

23. The system of claim 20 wherein the microwave heating source comprises a multifrequency microwave heating source.

24. The system of claim 20, wherein the microwave heating source has an adjustable power level.

25. A system for thermally processing materials comprising:
a furnace housing having a furnace chamber;
a support assembly disposable in the furnace chamber for supporting the materials to be thermally processed;
a microwave heating source operative to heat materials in the furnace chamber;
a convection/radiation heating source operative to heat the materials in the furnace chamber;
at least one eductor on each side of the furnace chamber, each eductor having an outlet located in the furnace chamber to provide circulation of gas within the furnace chamber, the eductors each comprising a device producing a high volume flow of a mixture of a gas entrained in an injected high pressure gas; and
a controller in communication with the eductors, the controller including a timing cycle to alternate operation of the at least one eductor on one side and operation of the at least one eductor on the other side to provide forward and reverse flow directions in the chamber, to achieve a uniform circulation of gas in the chamber and uniform heating of the materials.

26. The system of claim 25 including a plurality of eductors on first and second sides of the furnace chamber for providing a uniform gas atmosphere in the furnace chamber.

27. The system of claim 25 wherein the microwave heating source comprises a variable frequency microwave heating source.

28. The system of claim 25 wherein the microwave heating source comprises a multi-frequency microwave heating source.

29. The system of claim 25 wherein the support assembly includes an elevator hearth moveable between a lower position for loading and unloading of materials to be thermally processed, and an upper position for disposing the materials in the furnace chamber.

30. The system of claim 25 wherein the eductor includes a tubular body having a nozzle in communication with a gas supply and providing high velocity gas into the furnace chamber and disposed to entrain gas in the furnace chamber to provide high volume circulation of gas within the furnace chamber.

31. The system of claim 25 wherein the microwave heating source is operative during a portion of the heating cycle.

32. The system of claim 25 wherein the microwave heating source is operative for a period of time during a heating cycle when the materials being processed are at a temperature to be microwave receptive.

33. The system of claim 25 including a controller for controlling the microwave heating source and the convection/radiation heating source to provide an intended thermal profile during a heating cycle.

34. The system of claim 25 wherein the one or more eductors are operative to provide forced convection cooling of the materials during a portion of a thermal cycle.

35. The system of claim 25, wherein the furnace chamber includes a hearth having a plurality of openings extending through the hearth from one side of the furnace chamber to the other side of the furnace chamber; and the eductors are arranged in pairs on respective sides of the furnace chamber in line with a respective opening through the hearth.

36. The system of claim 35 wherein each of the eductors is disposed in a sidewall opening of the furnace housing.

37. The system of claim 25 wherein the convection/radiation heating source includes one or more electrically energized heaters disposed in the furnace chamber.

38. The system of claim 25 wherein the furnace chamber is in a batch furnace operative to have materials loaded therein for processing and unloaded after processing.

39. The system of claim 25 wherein the furnace chamber is in a continuous furnace operative to have materials conveyed therethrough during a processing cycle.

40. The system of claim 25, wherein the microwave heating source has an adjustable power level.

* * * * *

UNITED STATES PATENT AND TRADEMARK OFFICE
CERTIFICATE OF CORRECTION

| | |
|---|---|
| PATENT NO. | : 7,196,297 B2 |
| APPLICATION NO. | : 10/775542 |
| DATED | : March 27, 2007 |
| INVENTOR(S) | : Donald A. Seccombe, Jr. |

It is certified that error appears in the above-identified patent and that said Letters Patent is hereby corrected as shown below:

Column 5, line 46, "125-1500°C." should read --125-150°C.--; and

Column 8, claim 20, line 22, "tinting" should read --timing--.

Signed and Sealed this

Eleventh Day of November, 2008

JON W. DUDAS
*Director of the United States Patent and Trademark Office*